United States Patent
Runkel et al.

(10) Patent No.: US 6,478,120 B2
(45) Date of Patent: Nov. 12, 2002

(54) ACTUATING DEVICE HAVING AUTOMATIC ADJUSTMENT FOR A VEHICLE HYDRAULIC DISK BRAKE

(75) Inventors: Klaus Runkel, Neuwied (DE); Lothar Wagner, Steinefrenz (DE); Len Miller, Droitwich WOC. (GB)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/883,005

(22) Filed: Jun. 15, 2001

(65) Prior Publication Data

US 2002/0041123 A1 Apr. 11, 2002

Related U.S. Application Data

(63) Continuation of application No. PCT/EP99/10087, filed on Dec. 19, 1999.

(30) Foreign Application Priority Data

Dec. 8, 1998 (GB) ......................................... 198 58 651

(51) Int. Cl.[7] ............................................... F16D 55/02
(52) U.S. Cl. ................................. 188/71.9; 188/196 D
(58) Field of Search .............................. 188/71.9, 71.8, 188/196 D, 196 C, 72.6, 72.8, 72.9, 106 F

(56) References Cited

U.S. PATENT DOCUMENTS

| | | | | |
|---|---|---|---|---|
| 3,688,875 A | * | 9/1972 | Edward et al. | 188/196 F |
| 4,596,315 A | * | 6/1986 | Takeuchi et al. | 188/196 D |
| 4,809,819 A | * | 3/1989 | Harrison | 188/196 D |
| 5,038,895 A | * | 8/1991 | Evans | 188/106 F |
| 5,060,765 A | | 10/1991 | Meyer | |
| 5,086,884 A | * | 2/1992 | Gordon et al. | 188/196 D |
| 5,219,047 A | | 6/1993 | Fouilleux et al. | |
| 5,443,141 A | * | 8/1995 | Thiel et al. | 188/196 D |
| 6,053,289 A | | 4/2000 | Bauer et al. | |

FOREIGN PATENT DOCUMENTS

| | | |
|---|---|---|
| DE | 19521634 A1 | 12/1996 |
| EP | 0396231 A1 | 3/1990 |
| EP | 0403635 B1 | 8/1992 |
| WO | WO 91/10841 | 7/1991 |

\* cited by examiner

Primary Examiner—Christopher P. Schwartz
Assistant Examiner—Melanie Torres
(74) Attorney, Agent, or Firm—MacMillan, Sobanski & Todd, LLC

(57) ABSTRACT

The invention relates to an actuating apparatus (12) with automatic clearance adjustment for a vehicle hydraulic disk brake and includes a housing (14) having a base (16) and a shell (18) in which an open cylinder bore (20) is provided. For actuating the brake, a piston (24) is hydraulically displaceable in the bore. A mechanical actuating device for displacing the piston in the bore and for compensating lining wear comprises an expanding device (34) acting axially in a brake actuating direction and a length adjustable strut between the expanding device and the piston. The strut is formed by a first strut part (52) having a bolt shaped end, which is screwed into a second, substantially sleeve shaped strut part (54), which rests with a conical flange (68) against the piston. Between the bolt shaped end of the first strut part and the second strut part there is a cavity (90) which is to be filled with brake fluid and closed off in a fluid tight manner at one end. To ensure trouble free filling of the latter, the second strut part has in the region of the cavity a plurality of radial bores (92) which connect the cavity to an outer peripheral surface of the second strut part and in the conical flange a plurality of axial through bores (96) are provided which are disposed relative to the radial bores in such a way that in any rotational position of the second strut part relative to the housing shell at least one radial bore is situated above a horizontal reference plane extending through the longitudinal center line of the length adjustable strut and its radially outer bore end lies below at least one part of at least one axial through bore.

10 Claims, 2 Drawing Sheets

ACTUATING DEVICE HAVING AUTOMATIC ADJUSTMENT FOR A VEHICLE HYDRAULIC DISK BRAKE

This application is a continuation of PCT/EP99/10087 filed Dec. 19, 1999.

BACKGROUND OF THE INVENTION

The invention relates to an actuating apparatus with automatic clearance adjustment for a vehicle hydraulic disk brake according to the preamble of claim 1. Such an actuating apparatus is known from EP 0 403 635 B1.

Actuating apparatuses of said type are used in vehicle disk brakes which are to be usable also as an immobilizing brake (parking brake). For said reason, in addition to the hydraulic actuating facility a usually mechanical brake-actuating facility is provided, which comprises a preferably automatically operating clearance adjusting device so that, even when the brake linings are becoming worn, the actuating travel required for mechanical tightening of the brake does not become unduly long. In the case of the initially mentioned actuating apparatus, said clearance adjusting device comprises a first, substantially sleeve-shaped strut part, into which a second strut part having a bolt-shaped end is screwed. Both strut parts therefore form a length-adjustable adjusting strut.

When filling said actuating apparatus with brake fluid, the latter has to pass also into a cavity, which is delimited in the sleeve-shaped strut part at the end face of the latter by a fluid-tight wall and at the opposite other end by the bolt-shaped end of the second strut part. In the known actuating apparatus, the brake fluid passes into the said cavity through the thread pairing between the bolt-shaped end of the second strut part and the sleeve-shaped first strut part. For said purpose, the thread pairing has a certain axial clearance which allows the brake fluid to pass through.

In principle, in order to keep to a minimum the idle travel which has to be overcome during actuation of the parking brake, as small a thread clearance as possible is desirable. However, this involves the risk of air not being properly evacuable from said cavity when the actuating apparatus is filled with brake fluid so that the cavity is possibly not completely filled with brake fluid, which then leads in turn to an increased idle travel during hydraulic actuation.

SUMMARY OF THE INVENTION

The invention is to improve an actuating apparatus of the described type in such a way that despite as small as possilbe a thread clearance of the adjusting strut comprising the first and second strut part, trouble-free, i.e. complete filling of the cavity is possible. The invention is achieved by an actuating apparatus which has the features indicated in claim 1. The sleeve-shaped strut part, which rests with a conical flange against the brake piston, accordingly has in the region of the cavity a plurality of radial bores, which connect the cavity to the outer peripheral surface of the sleeve-shaped strut part. The sleeve-shaped strut part moreover has in its conical flange a plurality of axial through-bores, which are disposed relative to one another in such a way that, in any rotational position of the sleeve-shaped strut part relative to the housing of the actuating apparatus, the radially outer end of at least one radial bore, which is situated above a reference plane extending horizontally through the centre line of the actuating apparatus, lies below at least one part of at least one axial through-bore in the conical flange. Thus, above the fluid level in the actuating apparatus there is always one fluid connection between the cavity and the cylinder bore, in which the brake piston is displaceably disposed, so that, as the actuating apparatus is filled with brake fluid, air may be expelled from the cavity into the cylinder bore and complete filling of the cavity with brake fluid is guaranteed. The flow of brake fluid into the cavity is effected through the axial through-bores and radial bores in the sleeve-shaped strut part, which are situated below the said horizontal reference plane.

Thus, according to the invention, selection of the clearance of the thread pairing between the first and the second strut part need no longer involve having to ensure that brake fluid and/or air may pass through unimpeded. Rather, said thread clearance may be optimized in the sense of minimum idle travel during mechanical actuation.

In a preferred embodiment of the actuating apparatus according to the invention, in the sleeve-shaped strut part at least three radial bores and three axial through-bores are provided, which are in each case uniformly spaced apart from one another in peripheral direction. In another embodiment, four radial bores and six axial through-bores are provided, which are likewise uniformly distributed in peripheral direction.

Preferably, the numerical value of the ratio of the volume of the said cavity to the cross-sectional area of each axial through-bore and also the numerical value of the ratio of the volume of the cavity to the cross-sectional area of each radial bore is not greater than 1000. At any rate, the cross-sectional area of each radial bore and of each axial through-bore has to be large enough to prevent the corresponding opening from being blocked by drops of fluid which form as a result of the surface tension of the utilized fluid. If the numerical value of the said ratios is $\leq 1000$, then the said cavity may be completely filled with brake fluid within a reasonable time even at a relatively low filling pressure, e.g. a pressure of up to 6 bar.

When the actuating apparatus according to the invention comprises a spring washer arrangement, which is supported axially between a retaining ring and the conical flange of the sleeve-shaped strut part, then the retaining ring preferably has a cross section, which impedes the flow of brake fluid into the cavity and of air out of the cavity as little as possible and may, for example, be round. The spring washer arrangement, which in the described prior art is used together with a retaining ring of rectangular cross section, normally holds the conical flange against the corresponding inner cone of the brake piston and thereby prevents a rotation of the sleeve-shaped strut part relative to the brake piston. When the actuating apparatus according to the invention comprises a restoring spring, which is clamped in between the expanding device required for mechanical application of the brake piston and an approximately pot-shaped spring cage, then said spring cage preferably has in the region of its base a plurality of through-openings in order to impede a throughflow of brake fluid and air as little as possible. The said restoring spring is used to preload the expanding device into its normal position.

By virtue of the actuating apparatus according to the invention an improved vehicle disk brake with an immobilizing function is also provided, the idle travel of which during actuation of the mechanical immobilizing function may be kept very low.

BRIEF DESCRIPTION OF THE DRAWINGS

Two embodiments of an actuating apparatus according to the invention are described in detail below with reference to the accompanying diagrammatic drawings. Said drawings show.

DETAILED DESCRIPTION OF THE PREFERRED EMBODIMENTS

Figure 1:
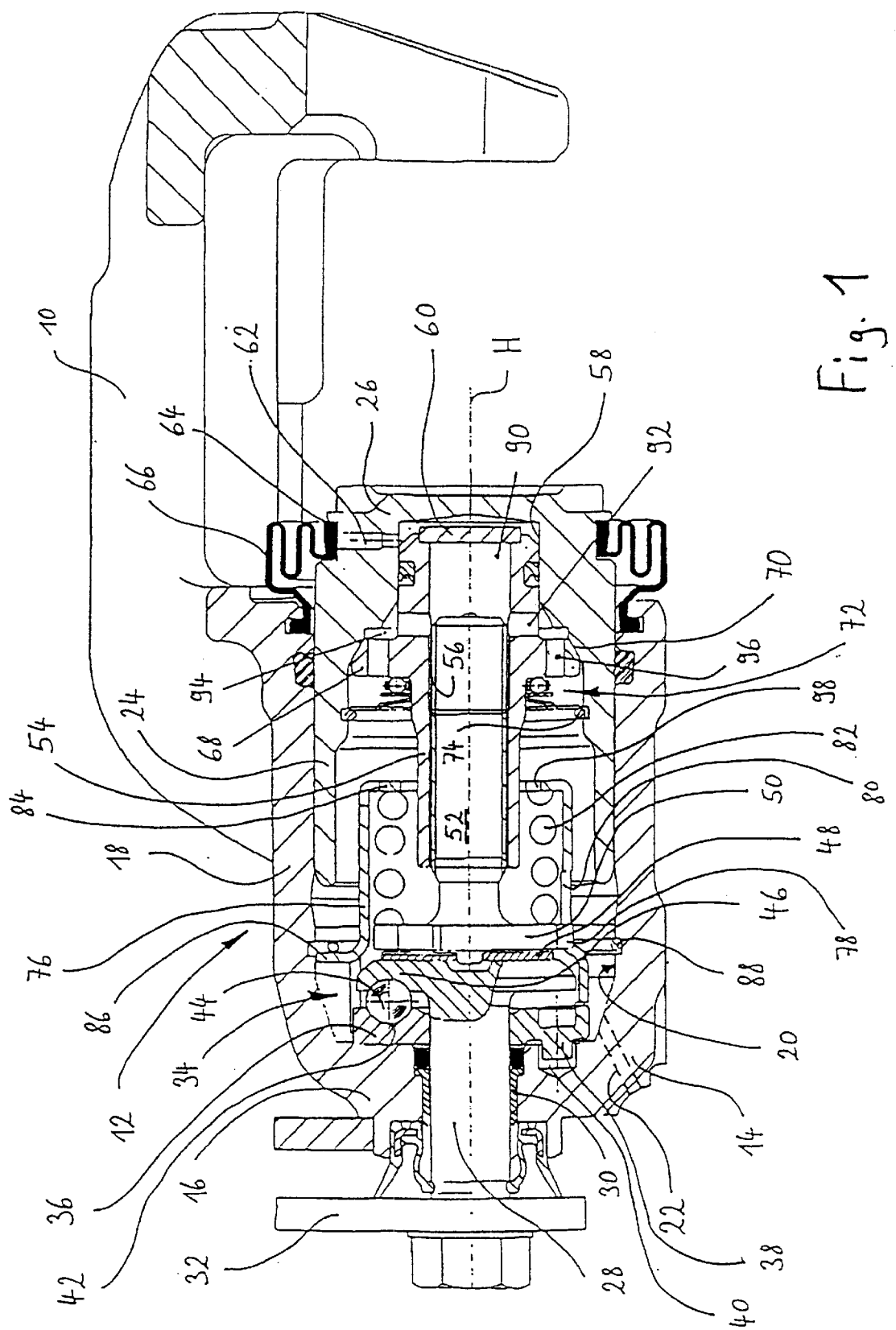
FIG. 1 in longitudinal section an actuating apparatus according to the invention, installed in a vehicle disc brake, FIG. 2 the plan view of a sleeve-shaped strut part of the actuating apparatus shown in FIG. 1 partially in section, and FIG. 3 a view corresponding to FIG. 2 of a modified sleeve-shaped strut part.

FIG. 1 shows a so-called spot-type disk brake having a floating caliper 10, which is guided on a brake carrier (not shown) so as to be in a conventional manner displaceable parallel to the axis of a brake disk (likewise not illustrated). Accommodated in the floating caliper 10 is an actuating apparatus generally denoted by 12, by means of which the friction linings (not shown here), also known as brake linings, may be pressed against the brake disk.

The actuating apparatus 12 comprises a housing 14, which in the present case is formed integrally with the floating caliper 10 and which comprises a housing base 16 and a housing shell 18. Formed in the housing 14 is a cylinder bore 20, which is open towards the non-illustrated brake disk and may be supplied with brake fluid through an inlet channel 22 illustrated by dashed lines. Displaceably guided in the cylinder bore 20 is a cup-shaped piston 24, the closed end wall 26 of which is intended for application against one of the non-illustrated brake linings.

In the housing base 16, a shaft 28 is supported isoaxially with the piston 24 in a rotatable and axially displaceable manner in a bearing bush 30. The actuating apparatus 12 is mechanically actuable by means of said shaft 28. For said purpose, a lever 32 is fastened to the outer end of the shaft 28 and connected e.g. by means of a Bowden cable to a parking brake lever or a parking brake pedal.

Lying against the inside of the housing base 16 is an expanding device, here in the form of a ball ramp arrangement 34, comprising an annular-disk-shaped plate 36 which is slipped onto and centred on the shaft 28. Said plate 36 is locked against rotation on the housing 14 by means of a pin 38, which engages into an axially parallel blind hole 40 in the housing base 16.

Formed on the housing-fixed plate 36 are three, in peripheral direction elongate, trough-like ramps 42, each of which receives an, in the present case, spherical expanding body 44. The expanding bodies 44 each cooperate with a corresponding ramp of a further, likewise annular-disk-shaped plate 46, which is axially adjustable and which in the illustrated embodiment is formed integrally with the shaft 28. The axially adjustable plate 46 is supported in axial direction, counter to a pressure exerted by the expanding bodies 44, via a thrust bearing 48 against an abutment 50 forming part of an adjusting strut which is variable in length.

The adjusting strut comprises a first, bolt-shaped strut part 52, which in the illustrated embodiment is formed integrally with the abutment 50, and a second, substantially sleeve-shaped strut part 54, into which the first strut part 52 is screwed. For said purpose, a non-selflocking steep-lead-angle thread pairing 56 is situated between the two strut parts 52 and 54. As will be explained later, the effective length of the adjusting strut, which is formed by the two strut parts 52 and 54 and disposed isoaxially relative to the piston 24 and the shaft 28, increases in accordance with the gradually advancing lining wear of the non-illustrated brake linings. The sleeve-shaped strut part 54 in its, in FIG. 1, right end portion is designed as an auxiliary piston and guided displaceably in a corresponding auxiliary cylinder bore 58 of the piston 24.

The end of the sleeve-shaped strut part 54 facing the end wall 26 of the piston 24 is tightly sealed by means of a base plate 60. The part of the auxiliary cylinder bore 58 delimited by said base plate 60 and the end wall 26, so that it remains constantly unpressurized, is connected by a radial vent channel 62 to an external groove 64 of the piston 24. Accommodated in the groove 64 is one end of bellows 66, which connects the end of the piston 24 projecting from the cylinder bore 20 to the housing 14 and so protects the cylinder bore 20 from fouling.

Formed on the sleeve-shaped strut part 54 is a conical flange 68, with which an inner cone 70 of the piston 24 is associated. Inside the piston 24 a spring washer arrangement 72 is arranged with axial bias between the flange 68 and a retaining ring 74, which is snapped into the piston 24. The spring washer arrangement 72 normally holds the flange 68 applied against the inner cone 70 and thereby prevents a rotation of the sleeve-shaped strut part 54 relative to the piston 24. The piston 24 is in turn prevented from rotating by conventional means, e.g. by virtue of its cooperating with the non-illustrated brake lining.

Disposed inside the cylinder bore 20—and extensively inside the cup-shaped piston 24—is an approximately pot-shaped spring cage 76, which is locked against axial displacement and against rotation on the housing 14. Said spring cage 76 is fashioned in such a way that it locks the bolt-shaped strut part 52 against rotation without impeding an axial displacement of the latter. To said end, a radial projection 78 of the abutment 50 engages into a longitudinal groove 80 of the spring cage 76.

An, in the present case, helically formed restoring spring 82 is supported by its one end against the side of the abutment 50 remote from the thrust bearing 48, while its other end is supported in the spring cage 76 against the base 84 of the latter. The restoring spring 82 is clamped in between the base 84 of the spring cage 76 and the abutment 50 and presses the ball ramp arrangement 34 into its normal position, in which the two plates 36 and 46 are the minimum axial distance apart from one another.

The spring cage 76 has a radially outward projecting bottom edge 86, which engages behind a radially resilient fastening element 88 snapped into the cylinder bore 20. The spring cage 76 accordingly presses via the restoring spring 82, the abutment 50, the thrust bearing 48 and the adjustable plate 46 as well as the expanding body 44 against the plate 36, thereby preventing the latter from being displaced axially away from the housing base 16.

There now follows a functional description of the actuating apparatus 12. Upon a hydraulic brake actuation at a moderate pressure which does not significantly deform the floating caliper 10 and the friction material of the brake linings, the piston 24 is displaced in the direction of the non-illustrated brake disk, i.e. out of the cylinder bore 20. So long as said displacement is not greater than the thread clearance, which exists in the steep-lead-angle thread pairing 56 between the strut parts 52 and 54 and corresponds to the intended brake clearance, the sleeve-shaped strut part 54 participates fully in the displacement of the piston 24 and the spring washer arrangement 72 does not yet give.

When, however, as a result of wear of the brake linings the piston 24 has to travel a distance exceeding the intended brake clearance in order to apply the brake linings against the brake disk, the bolt-shaped strut part 52, which is held fast by restoring spring 82, prevents the sleeve-shaped strut part 54 during hydraulic actuation from participating in the entire displacement of the piston 24 towards the brake disk.

Consequently, the conical flange 68 of the sleeve-shaped strut part 54 is lifted slightly off the inner cone 70 of the piston 24 counter to the resistance of the spring washer arrangement 72, which is weaker than the bias of the restoring spring 82. The sleeve-shaped strut part 54 is then no longer prevented from rotating about its axis.

The axial force, which is transmitted by the steep-lead-angle thread pairing 56 and with which the bolt-shaped strut part 52 attempts to restrain the sleeve-shaped strut part 54, has a peripheral component and therefore generates a torque, by means of which the sleeve-shaped strut part 54 is then rotated in such a way that it unscrews slightly from the bolt-shaped strut part 52. The conical flange 68 therefore comes to lie once more against the inner cone 70 of the piston 24. Because the effective length of the adjusting strut formed by the two strut parts 52 and 54 is then increased, the piston 24 after the brake actuation is no longer able to return into its original starting position, with the result that the brake clearance has been reduced back down to its setpoint value.

When the brake is to be actuated mechanically, e.g. for a parking brake operation, the shaft 28 is then rotated by means of the lever 32. The spherical expanding bodies 44 subsequently run up the ramps 42 of the two plates 36 and 46 and press the adjustable plate 46 axially in the direction of the non-illustrated brake disk. In said case, the plate 46 via the thrust bearing 48 exerts upon the abutment 50 and hence upon the bolt-shaped strut part 52 an axial pressing force which is transmitted from the steep-lead-angle thread pairing 56, after the thread clearance is overcome, to the sleeve-shaped strut part 54 and from the latter via the conical flange 68 and the inner cone 70 to the piston 24. The sleeve-shaped strut part 54 is in said case prevented from rotating so that the two strut parts 52 and 54 during a mechanical actuation form a completely rigid strut.

To enable the actuating apparatus 12 to be actuated hydraulically, its interior first has to be filled with brake fluid. This occurs through the already mentioned inlet channel 22. It is important that said filling with brake fluid is effected as completely as possible because air-filled cavities left behind in the actuating apparatus 12 lead at a later stage of operation to a perceptible lengthening of the actuating travel during a hydraulic actuation because said "air bubbles" first have to be compressed before it is possible to increase the pressure in the actuating apparatus up to the amount required for braking.

To enable the brake fluid to fill the interior of the actuating apparatus 12 as completely as possible and, in particular, pass into a cavity 90 formed in the sleeve-shaped strut part 54 between the end of the bolt-shaped strut part 52 and the base plate 60, the sleeve-shaped strut part 54 is provided in the region of the cavity 90 with a plurality of radial bores 92, which connect the cavity 90 to the outer peripheral surface of the sleeve-shaped strut part 54. The radial bores 92 open outside of the sleeve-shaped strut part 54 into an annular channel 94 which, as illustrated, is delimited by the strut part 54, its conical flange 68 and the inside of the piston 24.

Figure 2:
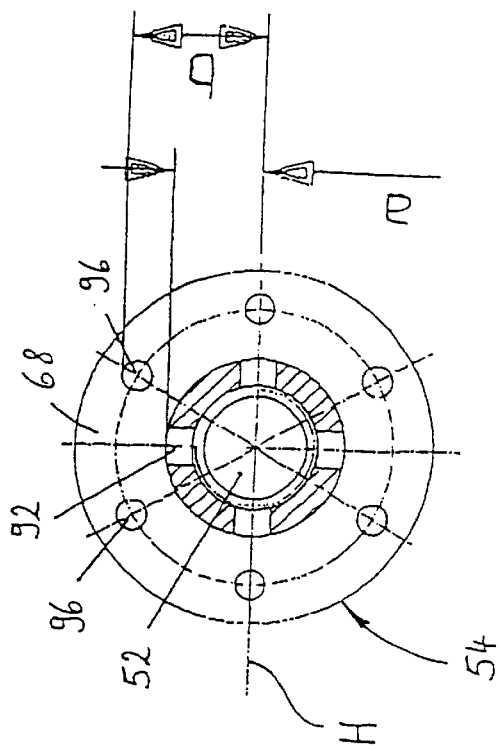
Figure 3:
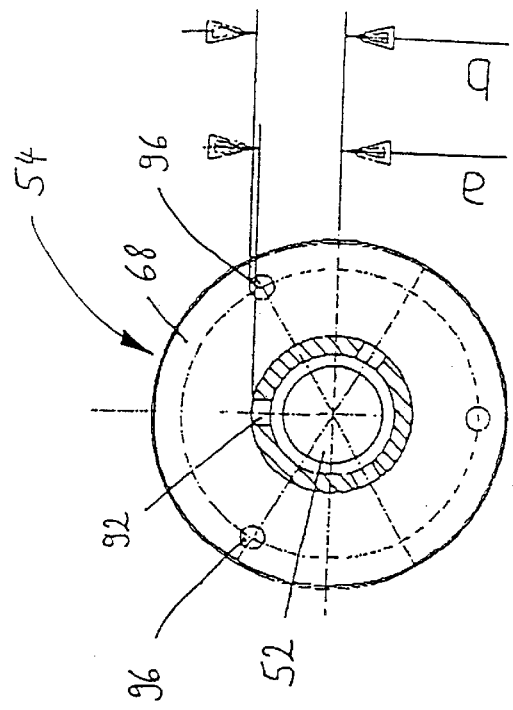

For connection of the annular channel 94 to the cylinder bore 20, a plurality of axial through-bores 96 are disposed in the conical flange 68. To enable all of the air contained in the cavity 90 to be fully displaced by the brake fluid flowing in, the radial bores 92 and the axial through-bores 96 are disposed relative to one another in such a way that, in any rotational position of the sleeve-shaped strut part 54 relative to the housing shell 18 and/or piston 24, at least one radial bore 92 and one axial through-bore 96 are situated above a horizontal reference plane H extending through the longitudinal centre line of the adjusting strut. Furthermore, said two bores 92 and 96 are disposed in such a way that the radially outer end of the bore 92 lies, in relation to the reference plane H, below at least one part of the axial through-bore 96. This means that in any rotational position of the sleeve-shaped strut part 54 at least one part of an axial through-bore 96 is, in relation to the reference plane H, higher than the radially outer end of the, in relation to the reference plane H, highest radial bore 92. In FIGS. 2 and 3 said fact is illustrated by the two dimensions a and b, wherein the dimension a in any rotational position of the sleeve-shaped strut part 54 has to be smaller than the dimension b. Thus, when the actuating apparatus 12 is being filled with brake fluid, air situated in the cavity 90 may always escape out of the cavity 90 into the part of the cylinder bore 20 situated above the reference plane H.

According to FIG. 2, four radial bores 92 and six axial through-bores 96 are provided, which are in each case uniformly spaced apart from one another in peripheral direction. According to FIG. 3, only three radial bores 92 and three axial through-bores 96 are provided, which are likewise all distributed uniformly in peripheral direction.

To enable the inflow of brake fluid through the bores 92 and 96 and the evacuation of air through said bores to occur properly, the free cross section of said bores 92 and 96 may not be too small. It has proved advantageous when the numerical value of the ratio of the volume of the cavity 90 to the cross-sectional area of each axial through-bore 96 and/or of each radial bore 92 is not greater than 1000. The bores 92 and 96 are then large enough to allow adequately fast filling of the actuating apparatus 12 with brake fluid even when the brake fluid is supplied at a relatively low pressure. If, for example, the volume of the cavity 90 is 800 mm$^3$, then each axial through-bore 96 and each radial bore 92 should have at least an opening cross section of 0.8 mm$^2$.

To improve the flow conditions inside the actuating apparatus 12 further, the retaining ring 74 has a round cross section. Furthermore, to keep the flow resistance inside the actuating apparatus 12 low, a plurality of through-openings 98 are provided in the base 84 of the spring cage 76.

What is claimed is:

1. An actuating apparatus with automatic clearance adjustment for a vehicle hydraulic disk brake comprising:

a housing including a housing base and a housing shell with an open cylinder bore;

a piston, which for actuating the brake is hydraulically displaceable in the cylinder bore; and a mechanical actuating device for displacing the piston in the cylinder bore and for compensating brake lining wear, which mechanical actuating device including an expanding device acting axially in a brake actuating direction and a length adjustable strut disposed between the expanding device and the piston, which length adjustable strut formed by a first strut part with a bolt shaped end, which is screwed into a second, substantially sleeve shaped strut part, which rests with a conical flange against the piston, wherein between the bolt shaped end of the first strut part and the second sleeve shaped strut part there is a cavity, which is to be filled with brake fluid and is closed off in a fluid tight manner at one end, wherein the second sleeve shaped strut part has in the region of the cavity a plurality of radial bores, which connect the cavity to an outer peripheral surface of the second sleeve shaped strut part, and in the conical flange has a plurality of axial through bores, which are disposed relative to one another in such a way that in any rotational position of the second sleeve shaped strut part relative to the housing at least one radial bore is situated above a horizontal reference plane extending through a longitudinal center line of the length adjustable strut and a radially outer bore end thereof lies below at least one part of at least one axial through bore.

2. The actuating apparatus according to claim 1 wherein at least three radial bores and three through bores are provided in the second sleeved shaped strut part.

3. The actuating apparatus according to claim 1 wherein a numerical value of a ratio of a volume of the cavity to a cross sectional area of each axial through bore and a numerical value of a ratio of the volume of the cavity to a cross sectional area of each radial bore is not greater than 1000.

4. The actuating apparatus according to claim 1 further including a spring washer arrangement, which is supported axially between a retaining ring and the conical flange of the second sleeve shaped strut part, wherein the retaining ring has a round cross section which thereby impedes a fluid flow in the actuating apparatus as little as possible.

5. The actuating apparatus according to claim 1 further including a restoring spring, which is clamped in between the expanding device and a generally pot shaped spring cage and biases the expanding device into a normal position, wherein the spring cage has in the region of a base thereof a plurality of through openings.

6. A vehicle disk brake including an actuating apparatus with automatic clearance adjustment therefor, the actuating apparatus including a housing including a housing base and a housing shell with an open cylinder bore; a piston, which for actuating the brake is hydraulically displaceable in the cylinder bore; and a mechanical actuating device for displacing the piston in the cylinder bore and for compensating brake lining wear, which mechanical actuating device including an expanding device acting axially in a brake actuating direction and a length adjustable strut disposed between the expanding device and the piston, which length adjustable strut formed by a first strut part with a bolt shaped end, which is screwed into a second, substantially sleeve shaped strut part, which rests with a conical flange against the piston, wherein between the bolt shaped end of the first strut part and the second sleeve shaped strut part there is a cavity, which is to be filled with brake fluid and is closed off in a fluid tight manner at one end, wherein the second sleeve shaped strut part has in the region of the cavity a plurality of radial bores, which connect the cavity to an outer peripheral surface of the second sleeve shaped strut part, and in the conical flange has a plurality of axial through bores, which are disposed relative to one another in such a way that in any rotational position of the second sleeve shaped strut part relative to the housing at least one radial bore is situated above a horizontal reference plane extending through a longitudinal center line of the length adjustable strut and a radially outer bore end thereof lies below at least one part of at least one axial through bore.

7. The vehicle disk brake according to claim 6 wherein at least three radial bores and three through bores are provided in the second sleeved shaped strut part.

8. The vehicle disk brake according to claim 6 wherein a numerical value of a ratio of a volume of the cavity to a cross sectional area of each axial through bore and a numerical value of a ratio of the volume of the cavity to a cross sectional area of each radial bore is not greater than 1000.

9. The vehicle disk brake according to claim 6 further including a spring washer arrangement, which is supported axially between a retaining ring and the conical flange of the second sleeve shaped strut part, wherein the retaining ring has a round cross section which thereby impedes a fluid flow in the actuating apparatus as little as possible.

10. The vehicle disk brake according to claim 6 further including a restoring spring, which is clamped in between the expanding device and a generally pot shaped spring cage and biases the expanding device into a normal position, wherein the spring cage has in the region of a base thereof a plurality of through openings.

* * * * *